United States Patent
Kim et al.

(10) Patent No.: US 9,989,201 B1
(45) Date of Patent: Jun. 5, 2018

(54) LIGHTING DEVICE HAVING SWITCHES EXPOSED THROUGH CORRESPONDING HOLES FORMED ON HOUSING

(71) Applicant: INTERLOG CORPORATION, Anaheim, CA (US)

(72) Inventors: Suk Hee Kim, Anaheim, CA (US); Justin Kwon, Anahaim, CA (US)

(73) Assignee: INTERLOG CORPORATION, Anaheim, CA (US)

( * ) Notice: Subject to any disclaimer, the term of this patent is extended or adjusted under 35 U.S.C. 154(b) by 0 days. days.

(21) Appl. No.: 15/711,842

(22) Filed: Sep. 21, 2017

Related U.S. Application Data

(60) Provisional application No. 62/399,158, filed on Sep. 23, 2016.

(51) Int. Cl.
| | |
|---|---|
| B60L 1/14 | (2006.01) |
| F21K 9/275 | (2016.01) |
| B60Q 1/02 | (2006.01) |
| B60Q 1/14 | (2006.01) |
| F21S 8/08 | (2006.01) |
| H05B 33/08 | (2006.01) |
| H01H 13/14 | (2006.01) |
| B60R 16/03 | (2006.01) |
| B60Q 3/80 | (2017.01) |
| F21V 15/01 | (2006.01) |
| B60Q 1/00 | (2006.01) |
| F21Y 115/10 | (2016.01) |
| F21V 23/00 | (2015.01) |
| F21V 23/04 | (2006.01) |

(52) U.S. Cl.
CPC ............... *F21K 9/275* (2016.08); *B60Q 1/02* (2013.01); *B60Q 1/143* (2013.01); *B60R 16/0315* (2013.01); *F21S 8/085* (2013.01); *H01H 13/14* (2013.01); *H05B 33/0854* (2013.01); *B60Q 1/0076* (2013.01); *B60Q 3/80* (2017.02); *F21V 15/01* (2013.01); *F21V 23/003* (2013.01); *F21V 23/04* (2013.01); *F21Y 2115/10* (2016.08); *H01H 2231/05* (2013.01)

(58) Field of Classification Search
CPC .... F21V 2115/10; F21V 23/003; F21V 23/04; F21V 15/00; F21V 15/01; B60Q 1/0076; B60Q 3/80
USPC ................... 362/543–546, 488, 493; 315/77; 307/10.1, 10.8
See application file for complete search history.

(56) References Cited

U.S. PATENT DOCUMENTS

| | | | |
|---|---|---|---|
| 7,429,122 B1 * | 9/2008 | Shofar | F21V 23/04 362/542 |
| 9,820,350 B2 * | 11/2017 | Pyshos | H05B 33/0863 |
| 2018/0035510 A1 * | 2/2018 | Doheny | F21V 17/12 |

* cited by examiner

*Primary Examiner* — Thuy Vinh Tran
(74) *Attorney, Agent, or Firm* — Lee, Hong, Degerman, Kang & Waimey

(57) ABSTRACT

A lighting device includes a housing; a plurality of light emitting diodes (LEDs) located on a first side of the housing; a plurality of switches for controlling the plurality of LEDs; and a controller operably coupled with the plurality of switches and configured to control operations of the plurality of LEDs in response to inputs received via the plurality of switches. Each of the plurality of switches is exposed through a corresponding hole formed at the housing, and a top surface of each of the plurality of switches is lower than a surface of the housing through which the plurality switches are exposed.

20 Claims, 6 Drawing Sheets

Driver　　　　　　　　　　Cabin Crew

LIGHTING DEVICE HAVING SWITCHES EXPOSED THROUGH CORRESPONDING HOLES FORMED ON HOUSING

CROSS REFERENCE TO RELATED APPLICATIONS

Pursuant to 35 U.S.C. § 119(e), this application claims the benefit of Provisional Application No. 62/399,158 filed on Sep. 23, 2016, the contents of which are hereby incorporated by reference herein in its entirety.

FIELD OF THE INVENTION

This invention relates to a lighting device. In particular, this invention relates to a light emitting diode (LED) lighting device suitable for military use.

BACKGROUND OF THE INVENTION

A lighting device having various light colors needs to be controlled selectively to provide a proper light color depending on a circumstance. In particular, under a military environment, illuminating incorrect light color may cause a critical situation, and thus, a mechanism for controlling the lighting device is necessary to prevent accidental illumination of incorrect light color.

SUMMARY OF THE INVENTION

The present invention will become more fully understood from the detailed description given herein below and the accompanying drawings, which are given by illustration only, and thus are not limitative of the present invention.

A lighting device according to an embodiment of the present invention includes a housing; a plurality of light emitting diodes (LEDs) located on a first side of the housing; a plurality of switches for controlling the plurality of LEDs; and a controller operably coupled with the plurality of switches and configured to control operations of the plurality of LEDs in response to inputs received via the plurality of switches. In one aspect of the present invention, each of the plurality of switches is exposed through a corresponding hole formed at the housing. In another aspect of the present invention, a top surface of each of the plurality of switches is lower than a surface of the housing through which the plurality switches are exposed.

BRIEF DESCRIPTION OF THE DRAWINGS

The present invention will become more fully understood from the detailed description given herein below and the accompanying drawings, which are given by illustration only, and thus are not limitative of the present invention, and wherein.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

According to an embodiment of the present invention, an LED dome lighting device has an X-second hold function for a white light option. The LED dome lighting device may have several levels, for example up to four levels, of dimming function for both colored and white lights. The LED dome lighting device may be operated according to a set operation priority. The LED dome lighting device may be waterproof (for example, IP67 1 meter submersible) and installed onto various panels and connectors.

Figure 1:
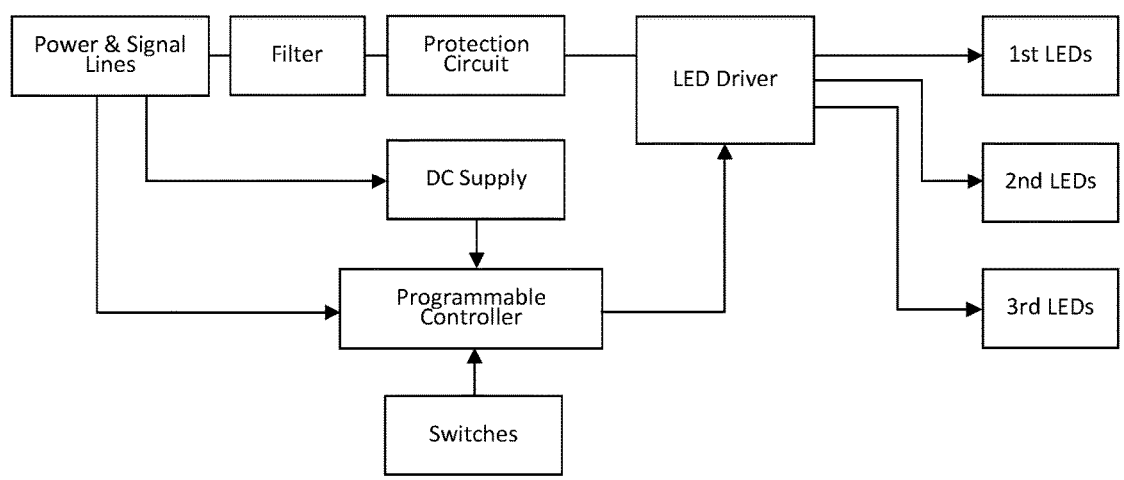
FIG. 1 is a block diagram of a lighting device according to an embodiment of the present invention.

FIG. 1 is a block diagram of a lighting device according to an embodiment of the present invention. Referring to FIG. 1, for example, the lighting device includes power and signal lines, filter, protection circuit, LED driver, LEDs, DC supply, programmable controller, and switches.

In the lighting device, power and signal lines are provided to the DC supply and the programmable controller, the DC supply and the switches also provided to the programmable controller. The power and signal lines are also provided to the LED driver via the filter and protection circuit and the first, second, and third LEDs are controlled by the programmable controller via the LED driver. Controlling of the LEDs is described below.

Figure 2:
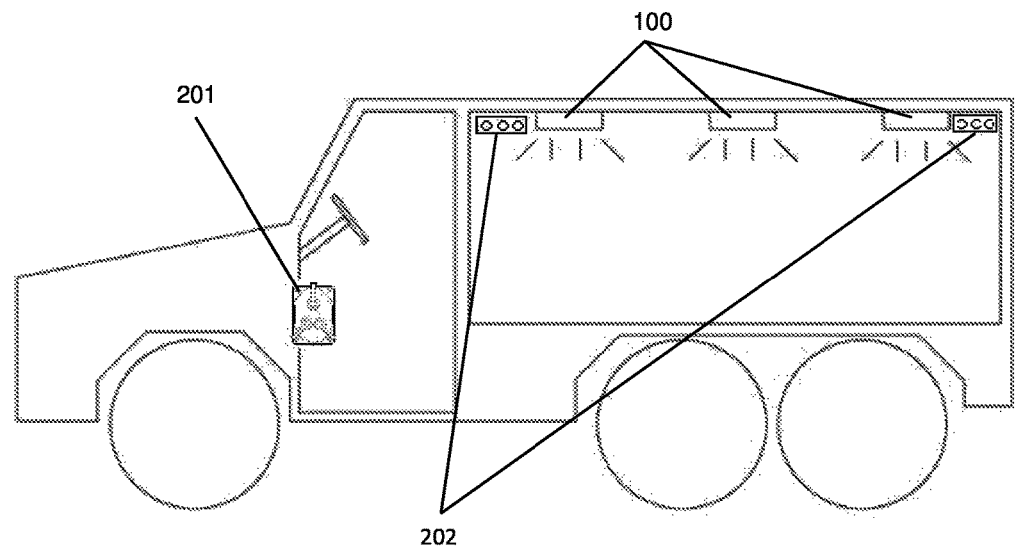
FIG. 2 shows a vehicle including an LED dome lighting device and an exemplary arrangement of switches and LEDs according to an embodiment of the present invention.
Figure 2:
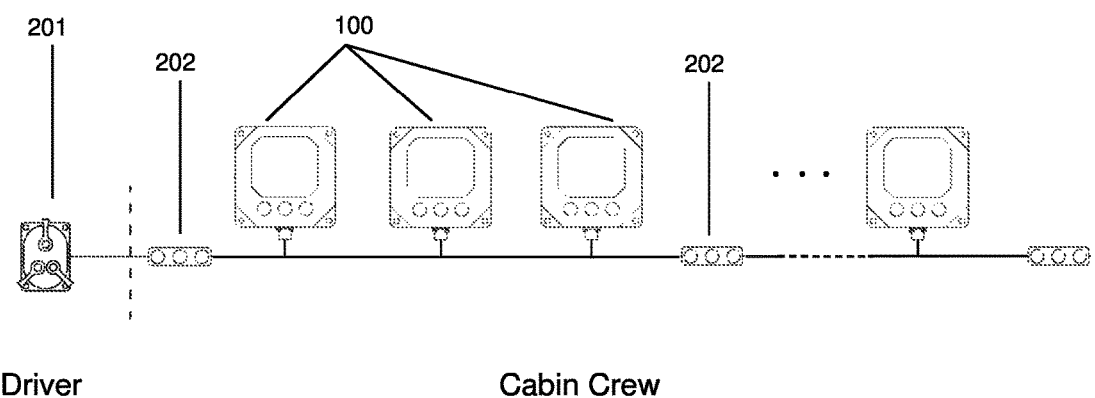
Figure 3:
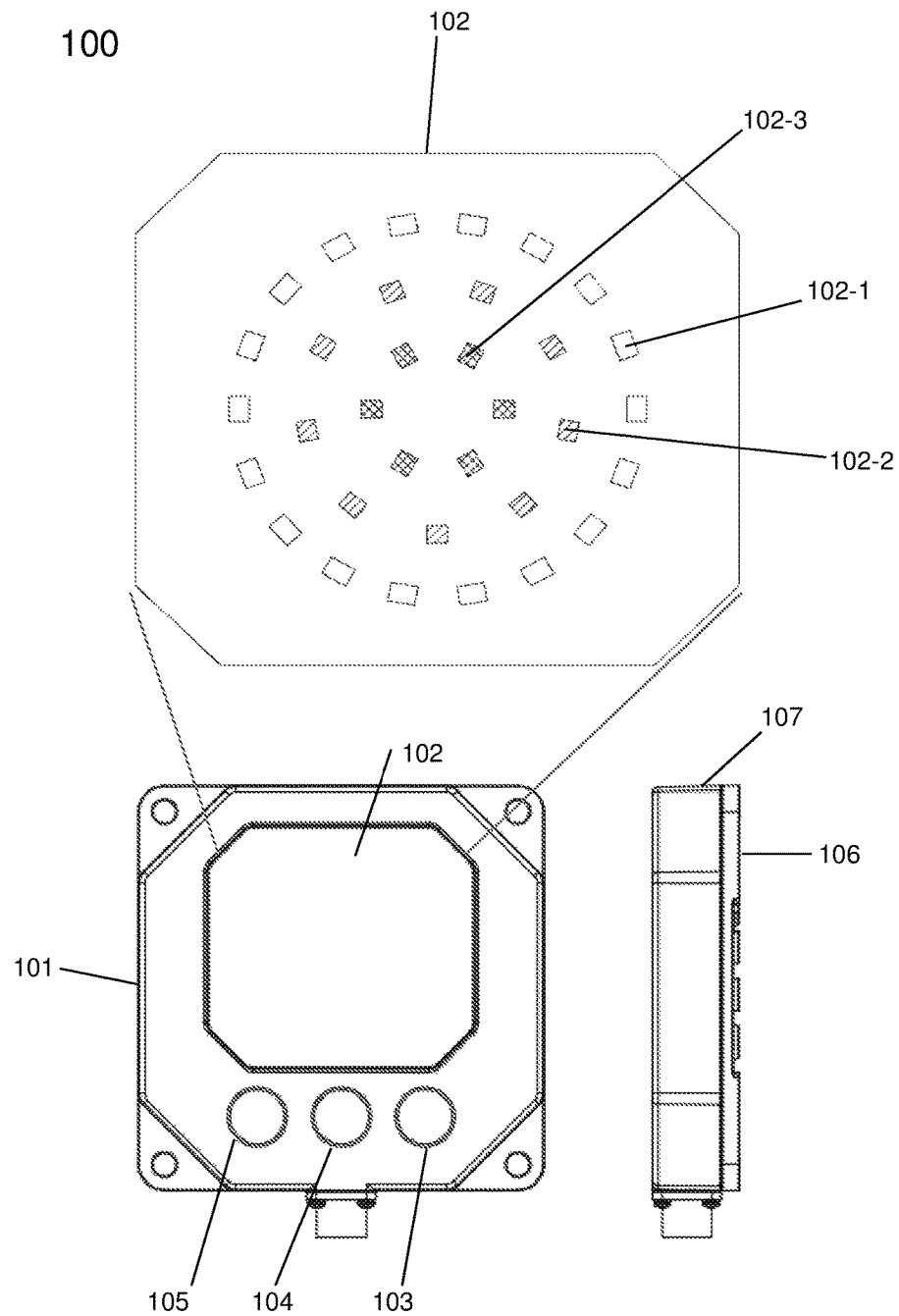
FIG. 3 shows a front orthogonal view and a first side orthogonal view of an LED dome lighting device according to an embodiment of the present invention.
Figure 4:
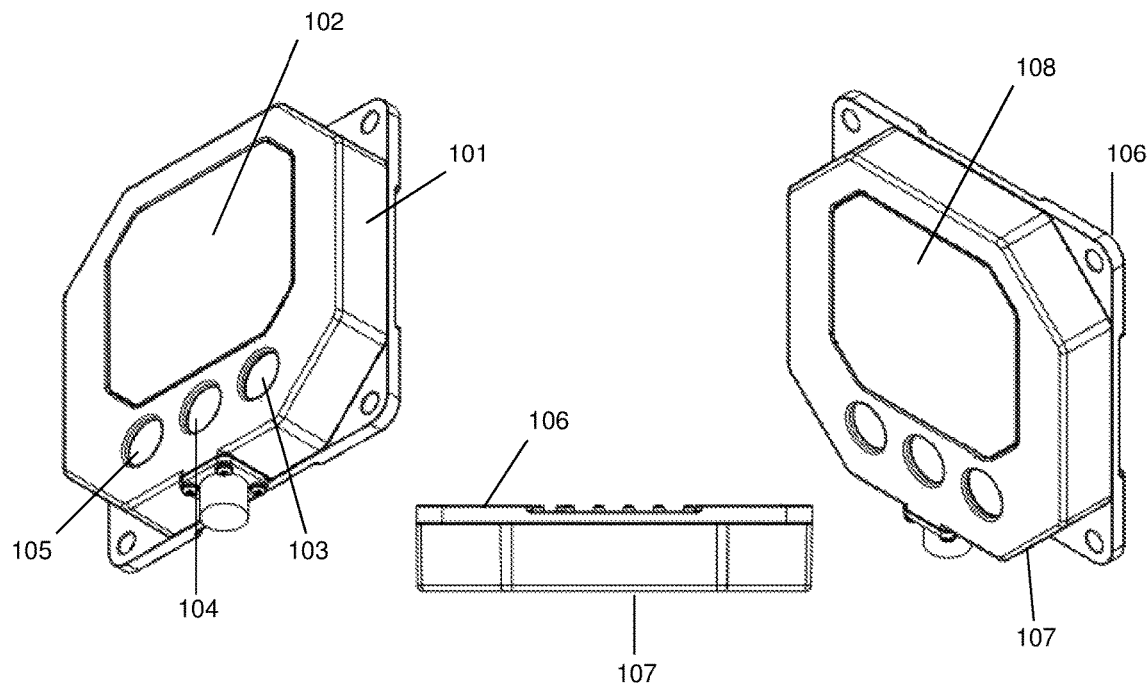
FIG. 4 shows a first front perspective view, a second side orthogonal view, and a second front perspective view of an LED dome lighting device according to an embodiment of the present invention.
Figure 5:
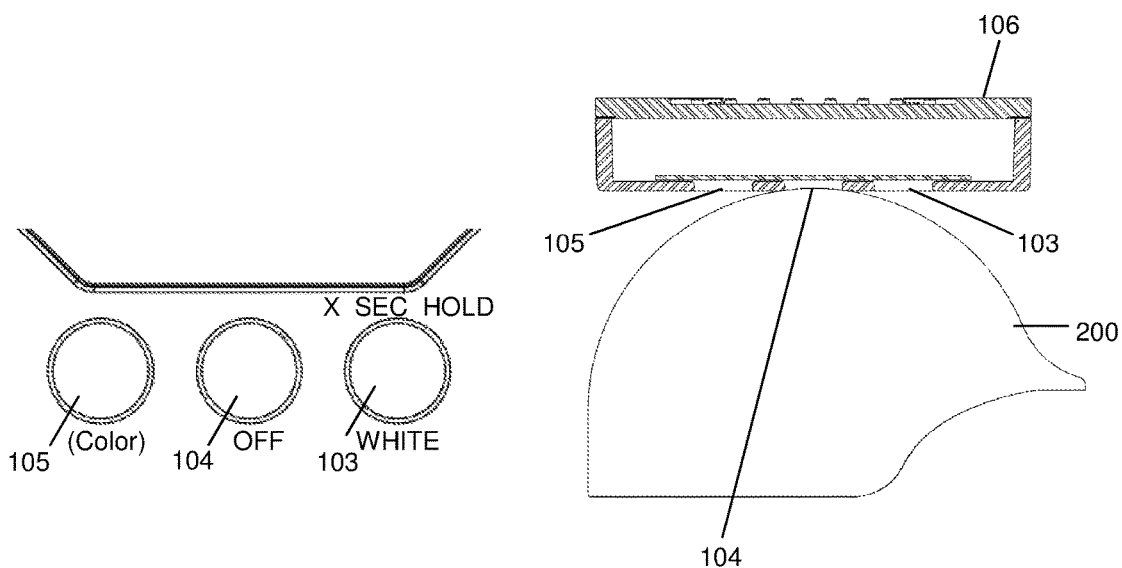
FIG. 5 shows a frontal view of switches and a side view of switches of an LED dome lighting device according to an embodiment of the present invention.

FIG. 2 shows a vehicle including an LED dome lighting device according to an embodiment of the present invention. FIG. 3 shows a front orthogonal view and a side orthogonal view of an LED dome lighting device according to an embodiment of the present invention. FIG. 4 shows a first front perspective view, a side orthogonal view, and a second front perspective view of an LED dome lighting device according to an embodiment of the present invention. FIG. 5 shows a frontal view of switches and a side view of switches of an LED dome lighting device according to an embodiment of the present invention.

Referring to FIG. 2, a lighting device 100 may be included in a vehicle. Although a vehicle is exemplified in FIG. 2, the lighting device 100 may be installed at any space or place. For example, the lighting device 100 may also be installed in a tent, building, boat, or airplane.

Further referring to FIG. 2, a master switch 201 (switch, vehicular lights) is provided in a first space such that a driver can control all lightings in the vehicle for each mode, i.e., a black out mode (combat mode) and a service mode (non-combat mode). In a second space that is separated from the first space, a cabin lighting control switch 202 is provided such that cabin crews can control all lights in the second space or cabin at one time by using this switch. For example, the cabin lighting control switch 202 may include 3 switches which has the same shape, dimension, color and arrangement with switches of light device (103, 104, 105). Any number of the cabin lighting control switches 202 may be installed at any location to control the color and brightness of the lightings.

Referring to FIGS. 3-5, a lighting device 100 includes a housing 101, a plurality of light emitting diodes (LEDs) 102 located on a first side of the housing, a plurality of switches 103, 104, 105 for controlling the plurality of LEDs, and a controller (programmable controller shown in FIG. 1) operably coupled with the plurality of switches and configured to control operations of the plurality of LEDs in response to inputs received via the plurality of switches. For example, the thickness of the housing 101 is about 1 inch or less than 1 inch, thus allowing the lighting device 100 to be as thin as possible. Having a thin lighting device 100 is advantageous because protrusion can be minimized. Further, at least one side or a plurality of sides of the lighting housing 101 may have a vent for cooling.

According to an embodiment of the present invention, the plurality of switches 103, 104, 105 are located on the first side of the housing as shown in FIGS. 3 and 4. However, the plurality of switches 103, 104, 105 and the plurality of LEDs 102 may be located on different sides of the housing 101 according to an alternative embodiment of the present invention.

According to an embodiment of the present invention, each of the plurality of switches 103, 104, 105 is exposed through a corresponding hole formed at the housing 101. For example, there are three holes formed at the housing 101 when there are three switches. According to an embodiment of the present invention, a top surface of each of the plurality of switches 103, 104, 105 is lower than a surface of the first side of the housing 101 with holes through which the plurality switches are exposed. Therefore, even if an object 200, such as a helmet, having a contact surface that is larger than a size of the top surface of each of the plurality of switches 103, 104, 105 approaches one or more of the plurality switches, the switch cannot be in contact with the object. See the drawing on the right side in FIG. 5. In other words, the plurality of switches 103, 104, 105 are designed and shaped to prevent mal-operation or accidental operation of the lighting device 100 and damages to the plurality of switches.

The switch 103, 104, or 105 can be operated only with an object that can be in contact with the switch. For example, the switch can be operated with a finger that can touch the switch 103, 104, or 105. Therefore, unless a user intentionally touches a specific switch, it is unlikely that the switch will generate a signal for controlling the plurality of LEDs 102.

According to an embodiment of the present invention, an input voltage for the lighting device 100 is in a range of 11 to 30 VDC, supporting 12 VDC and 24 VDC systems to increase security and provide illumination to crews in a cabin in case of low battery volt or emergency case. The lighting device 100 may be based on MS51073-1 (U.S. Government designed). In one aspect of the invention, the lighting device 100 does not monitor power and no internal power pack (battery) is necessary.

According to an embodiment of the present invention, the controller is further configured to progressively dim one of the LEDs 102 in response to successive inputs received via a corresponding one of the plurality of switches 103, 104, 105 such that the each one of the LEDs is dimmed step by step from a first level of brightness to a next level of brightness in response to each of the successive inputs, a brightness level of the one of the LEDs returning to the first level after a preset number of inputs are received via the corresponding one of the plurality of switches. That is, the level of brightness for the LED may be switched repeatedly in the order of 1, 2, 3, and 4 when the corresponding switch is pushed several times.

Referring to FIG. 3, according to an embodiment of the present invention, the plurality of LEDs 102 include at least a first group 102-1 consisting of white LEDs and a second group 102-2 consisting of colored LEDs. Both the first group 102-1 and the second group 102-2 of LEDS may have a dimming function described above. For example, a color of the second group 102-2 of LEDs is cyan or blue, red, or any customized color, and cyan light emitted from the second group of LEDs has a wavelength of about 500 nm+/−5 nm (495~505 nm). According to an embodiment of the present invention, the lighting device 100 may further include an optional third group 102-3 including mixed color LEDs, for example, blue and red. Blue or red is a general light color of a blackout mode in a military vehicle. The blue and red mixture increases a color rendering index (CRI) for medical operation. Optionally, the blue and red mixture may also work with white light to further increase the CRI.

The lighting device according to an embodiment of the invention may be used in a military vehicle such that the first group of LEDs 102-1 is used in a non-combat mode and the second group of LEDs 102-2 is used in a black out or combat mode. The lighting device 100 may be attached to a ceiling or a wall of the vehicle.

According to an embodiment of the present invention, the housing 101 of the lighting device 100 may include a base 106 and a cover 107 located on top of the base such that a space is formed between the base and the cover. According to an embodiment of the present invention, the base 106 and the cover 107 may be hermetically sealed.

According to an embodiment of the present invention, the plurality of switches 103, 104, 105 of the lighting device 100 are membrane switches. In one aspect of the invention, the membrane switches may be low profile membrane switches such that the plurality of switches 103, 104, 105 are not to be damaged or mal-operated by a mistake or incidentally. For example, possibility of damages by a rifle or other equipment in a vehicle in which the lighting device 100 is installed may be reduced by using the low profile membrane switches compared to a switch that protrudes from the device. Further, the plurality of switches 103, 104, 105 are recessed with respect to a top surface of the cover 107, and thus, the plurality of switches are not protruded from the lighting device 100.

According to an embodiment of the present invention, a plurality of holes are formed at the top surface of the cover 107 such that each of the plurality of switches 103,104,105 is exposed through a corresponding one of the plurality of holes. For example, the plurality of LEDs 102 are located at a recessed portion of the cover 107.

According to an embodiment of the present invention, the lighting device 100 may further include a protection lens 108 covering the recessed portion of the cover 107 such that the plurality of LEDs 102 are located underneath the protection lens.

Figure 6:
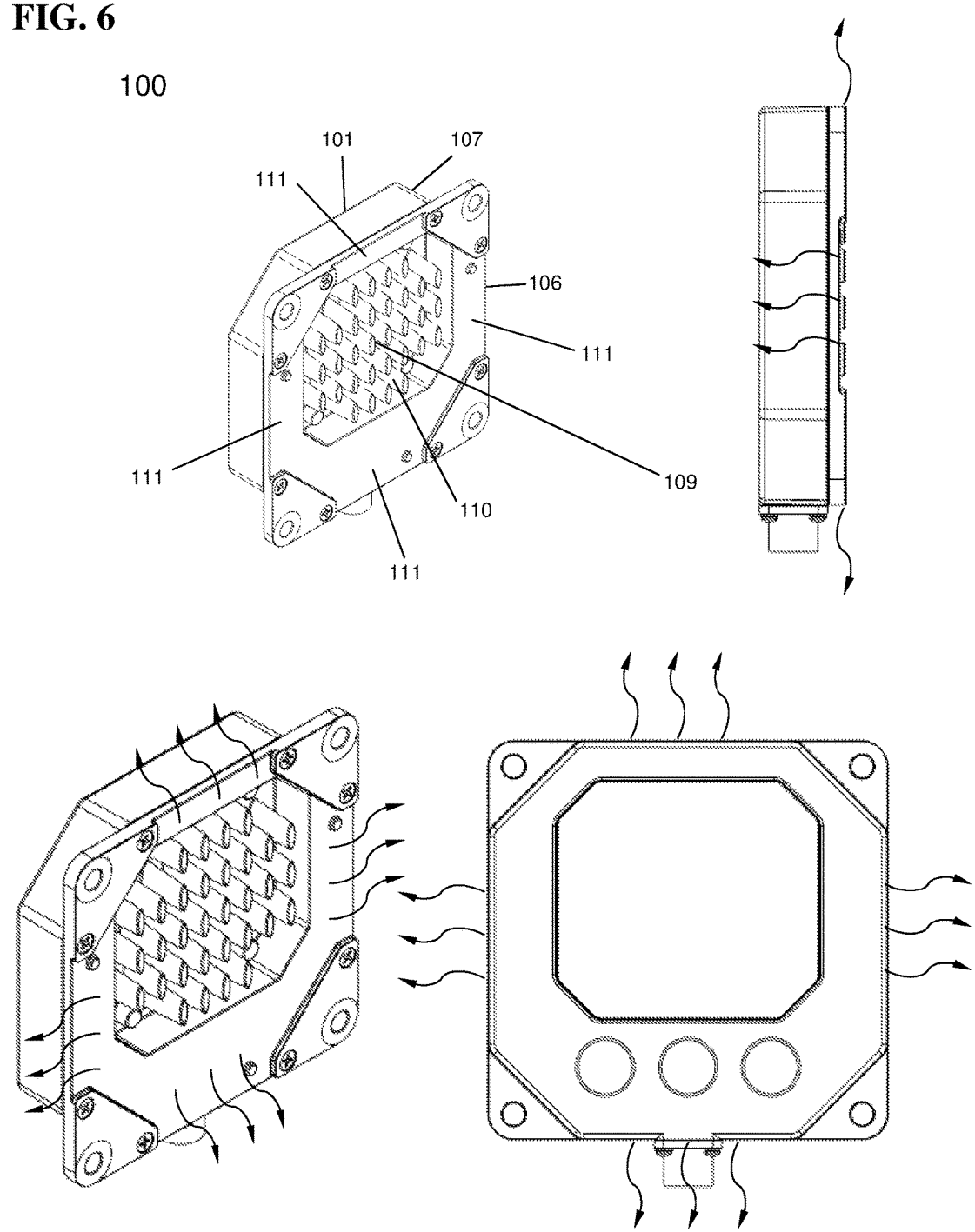
FIG. 6 shows a rear perspective view and frontal and side views of an LED dome lighting device according to an embodiment of the present invention.

FIG. 6 shows a rear perspective view of an LED dome lighting device according to an embodiment of the present invention.

Referring to FIG. 6, according to an embodiment of the present invention, a heat sink 109 is integrated in the base 106 of the lighting device 100 such that the heat sink is located on a second side of the housing 101 that is an opposite side of the first side. For example, the heat sink 109 includes a plurality of protrusions 110 formed at a recessed area of the base 106. As exemplified in FIG. 6, ventilation gap 111 allows heat dispensation to improve air flow when the lighting device 100 is attached to a surface without any gaps.

According to an embodiment of the present invention, the plurality of LEDs 102 of the lighting device 100 include at least a first group 102-1 consisting of white LEDs and a second group 102-2 consisting of colored LEDs that may be customized, and the plurality of switches 103, 104, 105 include at least a first switch 103 for controlling the first group of LEDs, a second switch 104 for turning off all of the plurality of LEDs 102, and a third switch 105 for controlling the second group of LEDs. The controller is further configured to turn on the first group of LEDs 102-1 in response to a first input received via the first switch 103 when the first input is received for a threshold hold time that is equal to or greater than X seconds. However, the first group of LEDs 102-1 is not turned on in response to an input that is received via the first switch 103 for less than X seconds. By requiring the threshold hold time for the first input, security can be improved while the lighting device 100 is used in a black-out mode (night vision operation or combat mode). Thus, even if the first switch 103 is touched accidentally or briefly for less than the threshold hold time, the first group of LEDs 102-1 is not turned on.

X may be an integer that is greater than 1 or 2. For example, X may be 2, 3, 4, or 5 such that the first group of LEDs 102-1 is turned on when the first input is received for more than 2, 3, 4, or 5 seconds, respectively, or when the first switch 103 is pushed for at least 2, 3, 4, or 5 seconds, respectively. The controller is further configured to turn on the second group of LEDs 102-2 in response to a second input received via the third switch 105, wherein no hold time is required for the second input to turn on the second group of LEDs. In case when both the first switch 103 and the second switch 105 are pushed accidentally, only the second group of LEDs 102-2 is turned on.

According to an embodiment of the present invention, the second switch 104 or "OFF" switch is for turning off the plurality of LEDs 102 such that all of the plurality of LEDs 102 are turned off in response to a third input received via the second switch, the third input received while at least one of the plurality of LEDs is on. According to an embodiment of the present invention, the first switch 103, the second switch 104, and the third switch 105 are individual switches that are physically separate from each other. For example, each of the first switch 103, the second switch 104, and the third switch 105 is colored differently. Further, each of the first switch 103, the second switch 104, and the third switch 105 may be labeled with a corresponding color of the light that is controlled for easier identification, as exemplified in FIG. 5. Furthermore, the first switch 103 may also be labeled to indicate that the first switch 103 should be pushed for a threshold hold time that is equal to or greater than X seconds, for example, 3 seconds as shown in FIG. 5.

According to an embodiment of the present invention, the controller is further operably coupled to a master switch (switch, vehicular lights) 201 that has a higher priority than the plurality of switches 103, 104, 105 such that all of the plurality of LEDs 102 are turned off when the master switch 201 is turned to an "OFF" mode while at least one of the plurality of LEDs is on. For example, the master switch 201 may be located at a space that is not the same as a space at which the lighting device 100 is located. In one embodiment of the present invention, when the lighting device 100 is installed in a vehicle, a driver may control the master switch 201 while passengers or cabin crews in the back cabin area are allowed to control the plurality of switches 103, 104, 105, the master switch having a higher priority than the plurality of switches.

According to an embodiment of the present invention, the first group of LEDs 102-1 is not turned on and the second group of LEDs 102-2 is turned on in response to the first input received while the master switch 201 is positioned at an "ON" mode for the second group of LEDs. According to an embodiment of the present invention, the second group of LEDs 102-2 is turned on in response to the second input received and the first group of LEDs 102-1 is turned on in response to the first input received while the master switch 201 is positioned at an "ON" mode for the first group of LEDs. According to an embodiment of the present invention, none of the plurality of LEDs 102 is turned on in response to the first or second input received while the master switch 201 is positioned at the "OFF" mode. That is, the master switch 201 suppresses all operations that are controllable via the plurality of switches 103, 104, 105.

The following is an exemplary control logic table for operation of the lighting device 100.

| Master Switch | Light Panel Switch (individual switches) | Light |
|---|---|---|
| Off | No action | Off |
| Off | White (first switch) | Off |
| Off | Color (second switch) | Off |
| Off | Off (third switch) | Off |
| Color | No action | Color (second group of LEDs) |
| Color | White[2] | Color |
| Color | Color | Color |
| Color | Off[1] | Off |
| White | No action | White (first group of LEDs) |
| White | White | White |
| White | Color[3] | Color |
| White | Off[1] | Off |

[1]While the master switch 201 is positioned at an "ON" mode for the first or seond group of LEDs 102-1 or 102-2, the individual light can be switched off by the second/off switch 104.
[2]While the master switch 201 is positioned at an "ON" mode for the second group of LEDs 102-2, the individual light cannot be switched on to first group of LEDs 102-1 (white) by the first switch 103. The colored light will remain.
[3]While the master switch 201 is positioned at an "ON" mode for the first group of LEDs 102-1, the individual light can be switched on to white or colored light by the light panel switch.

The following is an exemplary control logic table for operation of the lighting device 100 in case the master switch 201 has been complicated or when the master switch malfunctions such that mixed signals for both colored and white lights are generated even if the actual switch has been directed to operate only the colored or white light. That is, the master switch 201 does not actually have a physical switch to be directed to both colored and white.

| Master Switch | Light Panel Switch (individual switches) | Light |
|---|---|---|
| Color & White | No action | Color |
| Color & White | Color | Color |

-continued

| Master Switch | Light Panel Switch (individual switches) | Light |
|---|---|---|
| Color & White | White[5] | Color |
| Color & White | Off[4] | Off |

[4]While the master switch 201 malfunctions such that mixed signals for both colored and white lightsfor the first and second groups of LEDs 102-1 or 102-2 are generated, the individual light can be switched off by the second/off switch 104.
[5]While the master switch 201 malfunctions such that mixed signals for both colored and white lights for the first and second groups of LEDs 102-1 and 102-2 are generated, the individual light cannot be switched on to white light by the first switch 103. The light will remain blue or colored.

When the entire vehicle's power is turned off and then turned on again, the light will be turned on to the driver's (master) switch setting. The light setting is at the dimmest setting by default, and thus, storing the last known setting is not required although optionally the last setting may be stored.

According to an embodiment of the present invention, the controller is further configured to turn on only the second group of LEDs 102-2 when the first and second inputs are received at the same time.

While this invention has been particularly shown and described with references to example embodiments thereof, it will be understood by those skilled in the art that various changes in form and details may be made therein without departing from the scope of the invention encompassed by the appended claims.

What is claim is:

1. A lighting device comprising:
a housing;
a plurality of light emitting diodes (LEDs) located on a first side of the housing;
a plurality of switches for controlling the plurality of LEDs; and
a controller operably coupled with the plurality of switches and configured to control operations of the plurality of LEDs in response to inputs received via the plurality of switches,
wherein each of the plurality of switches is exposed through a corresponding hole formed at the housing, and
wherein a top surface of each of the plurality of switches is lower than a surface of the housing through which the plurality switches are exposed.

2. The lighting device of claim 1, wherein an input voltage for the lighting device is in a range of 11 to 30 VDC.

3. The lighting device of claim 1, wherein the controller is further configured to progressively dim one of the LEDs in response to successive inputs received via a corresponding one of the plurality of switches such that the one of the LEDs is dimmed step by step from a first level of brightness to a next level of brightness in response to each of the successive inputs, a brightness level of the one of the LEDs returning to the first level after a preset number of inputs are received via the corresponding one of the plurality of switches.

4. The lighting device of claim 1, wherein the plurality of LEDs comprise at least a first group of LEDs consisting of white LEDs and a second group of LEDs consisting of colored LEDs.

5. The lighting device of claim 4, wherein a color of the second group of LEDs is cyan, light emitted from the second group of LEDs having a wavelength of about 500 nm+/−5 nm (495~505 nm).

6. The lighting device of claim 4, wherein:
the lighting device is for use in a military vehicle;
the first group of LEDs is used in a non-combat mode; and
the second group of LEDs is used in a black out or combat mode.

7. The lighting device of claim 4, further comprising a third group of LEDs including blue and red mixed LEDs.

8. The lighting device of claim 1, wherein the housing comprises:
a base; and
a cover located on top of the base such that a space is formed between the base and the cover,
wherein the base and the cover are hermetically sealed.

9. The lighting device of claim 8, wherein the plurality of switches are membrane switches.

10. The lighting device of claim 9, wherein the membrane switches are back lighted.

11. The lighting device of claim 8, wherein the plurality of switches are recessed with respect to a top surface of the cover.

12. The lighting device of claim 11, wherein:
a plurality of holes are formed at the top surface of the cover; and
each of the plurality of switches is exposed through a corresponding one of the plurality of holes.

13. The lighting device of claim 8, wherein the plurality of LEDs are located at a recessed portion of the cover.

14. The lighting device of claim 13, further comprising a protection lens covering the recessed portion of the cover such that the plurality of LEDs are located underneath the protection lens.

15. The lighting device of claim 8, wherein a heat sink is integrated in the base such that the heat sink is located on a second side of the housing that is an opposite side of the first side.

16. The lighting device of claim 15, wherein the heat sink comprises a plurality of protrusions formed at a recessed area of the base.

17. The lighting device of claim 1, wherein:
the plurality of LEDs comprise at least a first group of LEDs consisting of white LEDs and a second group of LEDs consisting of colored LEDs;
the plurality of switches comprise at least a first switch for controlling the first group of LEDs, a second switch for turning off the plurality of LEDs, and a third switch for controlling the second group of LEDs;
the controller is further configured to:
turn on the first group of LEDs in response to a first input received via the first switch, the first input comprising a threshold hold time that is equal to or greater than X seconds, such that the first group of LEDs are not turn on in response to an input received via the first switch with a hold time of less than X seconds; and
turn on the second group of LEDs in response to a second input received via the third switch.

18. The lighting device of claim 17, wherein:
no hold time is required for the second input;
all of the plurality of LEDs are turned off in response to a third input received via the second switch, the third input received while at least one of the plurality of LEDs is on; and
the first switch, the second switch, and the third switch are individual switches that are physically separate from each other; and
each of the first switch, the second switch, and the third switch is colored differently.

19. The lighting device of claim 18, wherein the controller is further operably coupled to a master switch that has a higher priority than the plurality of switches such that:
- all of the plurality of LEDs are turned off when the master switch is turned to an "off mode" while at least one of the plurality of LEDs is on;
- the first group of LEDs is not turned on and the second group of LEDs are turned on in response to the first input received while the master switch is positioned at an "on mode" for the second group of LEDs;
- the second group of LEDs is not turned on and the first group of LEDs are turned on in response to the first input received while the master switch is positioned at an "on mode" for the first group of LEDs; and
- none of the plurality of LEDs is turned on in response to the first or second input received while the master switch is positioned at the "off mode".

20. The lighting device of claim 17, wherein the controller is further configured to turn on only the second group of LEDs when the first and second inputs are received at the same time.

\* \* \* \* \*